| United States Patent [19] | [11] | 4,446,589 |
|---|---|---|
| Maiocco | [45] | May 8, 1984 |

[54] WIPER BLADE AND LATERAL CONNECTOR

[75] Inventor: Giuseppe A. Maiocco, Rivoli, Italy

[73] Assignee: Champion Spark Plug Italiana, S.p.A., Druento, Italy

[21] Appl. No.: 379,656

[22] Filed: May 19, 1982

[30] Foreign Application Priority Data

Jun. 9, 1981 [IT] Italy ................................ 67789 A/81

[51] Int. Cl.³ ............................................... B60S 1/40
[52] U.S. Cl. .................................................. 15/250.32
[58] Field of Search ......................... 15/250.42, 550.32; 403/348, 349, 159, 157

[56] References Cited

U.S. PATENT DOCUMENTS

| 402,132 | 4/1889 | Berry | 403/349 |
|---|---|---|---|
| 4,083,642 | 4/1978 | Journee . | |
| 4,118,825 | 10/1978 | Hoebrechts et al. . | |
| 4,132,490 | 1/1979 | Journee . | |
| 4,158,513 | 6/1979 | Journee . | |
| 4,244,077 | 1/1981 | Harbison et al. . | |
| 4,361,353 | 11/1982 | Vinson | 403/348 X |

FOREIGN PATENT DOCUMENTS

| 2629546 | 1/1978 | Fed. Rep. of Germany . | |
|---|---|---|---|
| 2652334 | 5/1978 | Fed. Rep. of Germany . | |
| 2366151 | 6/1978 | Fed. Rep. of Germany | 15/250.32 |
| 2817224 | 10/1979 | Fed. Rep. of Germany . | |
| 2816206 | 10/1979 | Fed. Rep. of Germany | 15/250.32 |

Primary Examiner—Peter Feldman
Attorney, Agent, or Firm—Wood, Dalton, Phillips, Mason & Rowe

[57] ABSTRACT

A connector is provided between a wiper arm and a wiper blade. The connector includes aligned openings in the parallel walls of the wiper blade with extensions of the opening extending radially outward from the center of the opening. The connector also includes on the wiper arm a transverse member of a diameter slightly smaller than the diameter of the aligned openings in the blade. A pair of opposed stops extend radially outward from the transverse member with the stops being oriented to align with the extensions on the openings in the blade when the arm and blade are in any position other than the wiping position on the windshield. After the transverse member passes through the openings and the stops pass through the opening closest to the arms, the blade is rotated relative to the arm to secure the arm on the blade ready for wiping the windshield.

9 Claims, 12 Drawing Figures

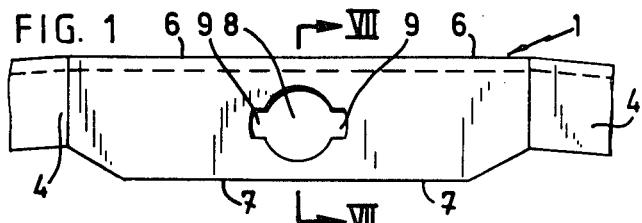
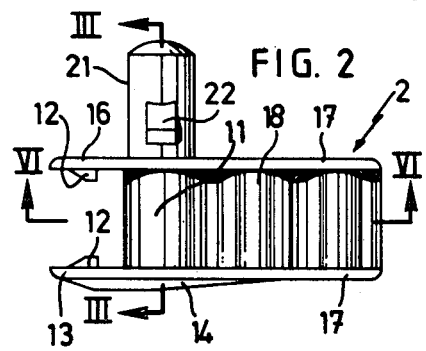
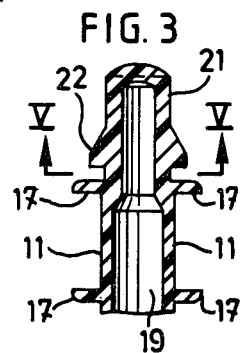
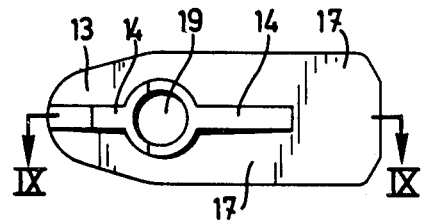
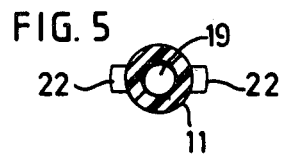
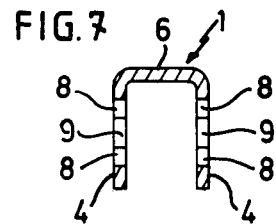
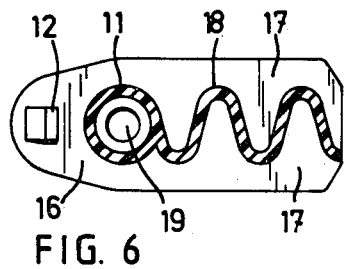
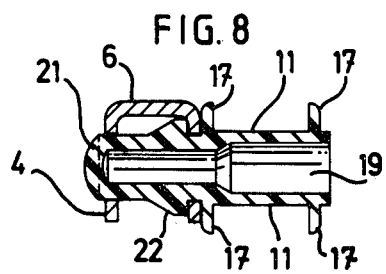

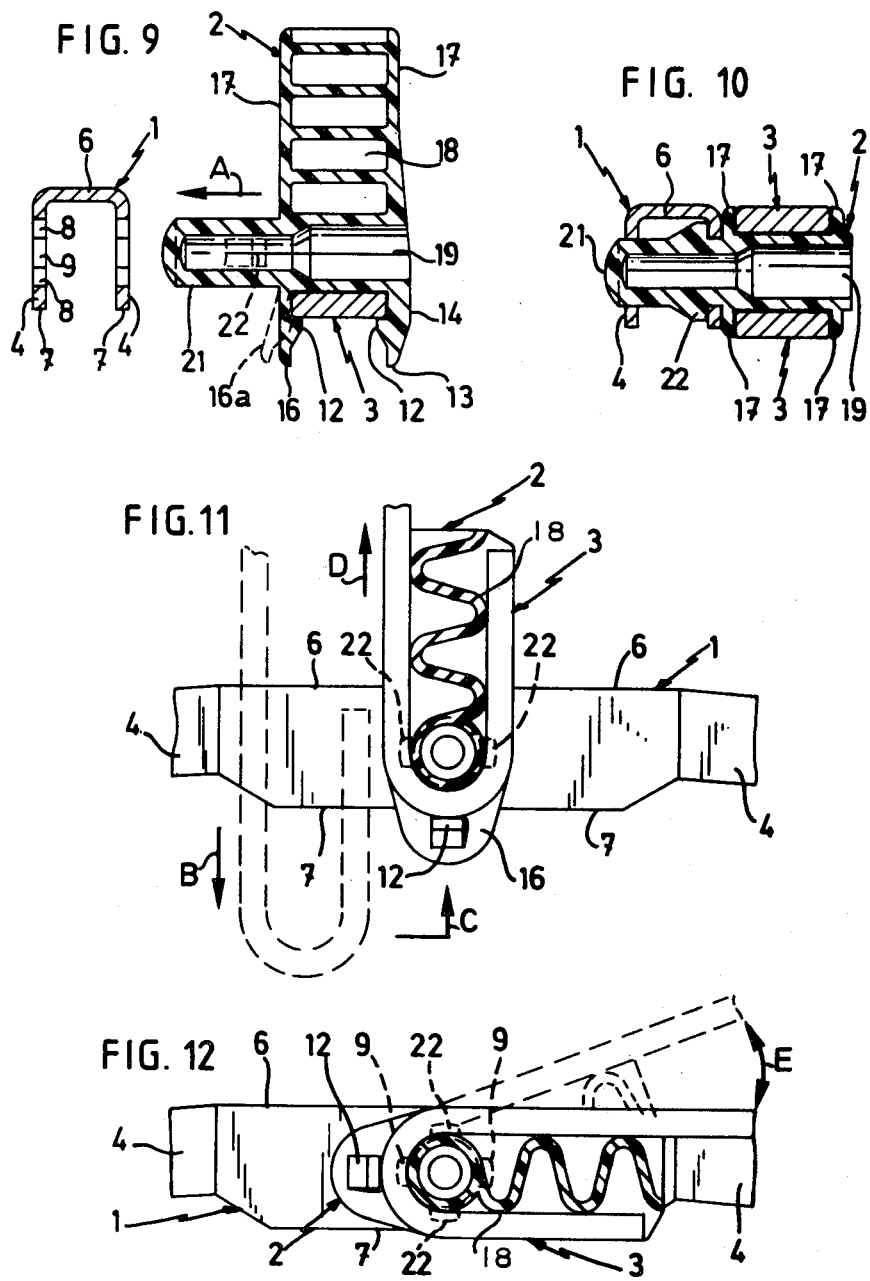

WIPER BLADE AND LATERAL CONNECTOR

DESCRIPTION

1. Technical Field

The present invention relates to a wiper blade bridge of which the cross section is substantially U-shaped and to a connector for attaching thereto a wiper arm. Such wiper blade bridges and connectors are for example used on motor vehicles.

2. Background Art

Bridges and/or connectors of the type described above are very widely known in the prior art and it is therefore not necessary to describe them in detail. By way of example German (Federal Republic) patent No. 2,404,004 and German (Federal Republic) patent application No. 2,816,206 may be mentioned, they both showing, like the present invention, a connector designed for attaching a wiper arm laterally with respect to the wiper blade.

German Pat. No. 2,404,004 discloses a connector comprising a lateral pivot pin which is inserted into a circular opening provided in one of the side walls of the bridge. Said pivot pin is maintained in the bridge by a central rivet rigidly secured to the other side wall of the bridge. The main disadvantage of the connector disclosed in said German patent is the fact that the bridge cannot be removed from the wiper arm.

The German patent application No. 2,816,206 discloses a connector also comprising a lateral pivot pin which is inserted into a circular opening provided in one of the side walls of the bridge. According to one of the embodiments disclosed in said German patent application the pivot pin is maintained in the bridge by a central screw which passes through an opening provided in the other side wall of the bridge. The main disadvantage of this connector is its complexity and consequently its manufacturing costs. Indeed the screw must be produced separately, a threading must be executed inside of the pivot pin and then the different parts must be assembled.

DISCLOSURE OF THE INVENTION

The disadvantages of the bridge/connector assemblies disclosed in the two German patents are eliminated in the bridge connector assembly according to the present invention wherein the two side walls of the U-shaped bridge each comprise a circular opening provided with two opposed extensions and wherein the connector comprises a cylindrical pivot pin provided with two opposed stops corresponding to said extensions of said circular openings of the U-shaped bridge.

For mounting the connector on the bridge the two stops of the pivot pin are placed in front of the two extensions of the opening provided in one of the side walls of the bridge. The pivot pin of the connector then can be pushed into the two openings of the connector. When the connector is now rotated by approximately 90° about the axis of its pivot pin, so that it is brought into its working position, it can no longer be disengaged from the bridge because the two stops of the pivot pin are, in this position, resting against the inside surface of the side wall of the bridge which is closest to the connector.

Other characteristics of the assembly bridge/connector according to the invention will be better understood when reading the following portions of the specification in conjunction with the accompanying drawings wherein:

BRIEF DESCRIPTION OF THE DRAWINGS

FIG. 1 is a side elevational view of the central portion of a wiper blade bridge according to the invention;

FIG. 2 is a top view of the connector according to the invention;

FIG. 3 is a sectional view along line 111—111 of FIG. 2;

FIG. 4 is a side elevational view of the connector;

FIG. 5 is a sectional view along line V—V of FIG. 3;

FIG. 6 is a sectional view along line VI—VI of FIG. 2;

FIG. 7 is a sectional view along line VII—VII of FIG. 1;

FIG. 8 is a sectional view similar to that of FIG. 7 wherein the connector of FIG. 2 is mounted on the bridge of FIG. 1;

FIG. 9 is a sectional view of the bridge of FIG. 1, identical to that of FIG. 7 and a sectional view of the connector of FIG. 2 along line IX—IX of FIG. 4, a wiper arm of the hook-end type being mounted on the connector;

FIG. 10 is a sectional view identical to that of FIG. 8, a wiper arm of the hook-end type being mounted on the connector;

FIG. 11 is a sectional view similar to that of FIG. 6, showing a wiper arm of the hook-end type in the process of being mounted on the connector;

FIG. 12 is a sectional view similar to that of FIG. 11 showing the assembly bridge/connector in its working position.

BEST MODE FOR CARRYING OUT THE INVENTION

FIGS. 1 and 7 show the wiper blade bridge 1 of which the transverse section (FIG. 7) is substantially U-shaped. The bridge 1 thus comprises two side walls 4 and a web 6. Each of the two side walls 4 of the bridge 1 is provided with a circular opening 8. The circular openings 8 are in line, with each opening having two opposed extensions 9.

FIGS. 2-6 show, by way of example, an embodiment of the connector 2 according to the invention. The connector 2 essentially comprises two portions: a first portion that serves to maintain the wiper arm on the connector and a second portion that serves to attach the connector 2 to the bridge 1.

In the present case, i.e., for the present invention, the most essential one of said two portions of the connector 2 is the portion which serves to attach the connector 2 to the bridge 1. This portion comprises a pivot pin 21 provided with two opposed stops 22. The diameter of the pivot pin 21 is slightly smaller than the diameter of the circular openings 8 of the bridge 1 and the dimensions of the two stops 22 are slightly smaller than the dimensions of the two extensions 9 of the circular openings 8 of the bridge 1. The pivot pin 21 may thus be inserted into said circular and aligned openings 8.

The second portion of the connector according to the invention, i.e., the portion that serves to maintain the wiper arm on the connector may in fact have many different configurations in order to be adaptable to either several types of hook-end arms, or to straightend arms, or to other types of arms. Indeed most of the connectors designed for said different types of arms, and known in prior art, may easily be adapted for use in conjunction with the pivot pin 21 of the present invention.

The connector 2 shown in FIGS. 2-6 is a connector designed for hook-end arms and more particularly for a hook-end arm 3 as shown on FIG. 11. Besides the pivot pin 21 the connector 2 comprises a cylindrical body 11 provided at its two extremities with two side walls, one outside side wall being 16, 17 and the other inside side wall being 13, 17. The rear portions 17 of said side walls are linked together by a reinforcing cross-piece 18 which, at the same time, serves to guide the two straight portions of the hook of the arm 3 (FIG. 11). At their inside surface each of the two front portions 13, 16 of said side walls of the connector 2 comprises a stop 12 for maintaining the arm 3 on the cylindrical body 11 of the connector 2 (FIGS. 2 and 12).

The way to attach the arm 3 on the connector 2 disclosed above is known in the prior art, with however the difference that in the prior art the two frontal portions 13, 16 of the side walls of the connector are flexible, whereas in the connector 2 according to the present invention only the front portion 16 of the inside side wall which is closest to the bridge 1 is flexible (FIG. 9).

The front portion 13 of the other or outside side wall of the connector 2 is not only rigid, but it is furthermore reinforced by a rib 14. Said rigidity and said reinforcement are necessary since, when oscillating as known per se, the arm 3 exerts a rather large force on the front portion 13 of said outside side wall of the connector 2.

FIGS. 8-12 show how the connector 2 is attached to the bridge 1, how the arm 3 is mounted on the connector 2 and how the arm 3 is brought into its working position.

For attaching the connector 2 to the bridge 1 it is first placed in a position such that the two stops 22 are in front of the corresponding two extensions 9 of the opening 8 of one of the side walls 4 of the bridge 1 (FIGS. 9 and 11). The pivot pin 21 of the connector 2 is then inserted into said openings 8 of the bridge 1 as shown by arrow A of FIG. 9. Once the pivot pin 21 has been completely inserted in said openings 8 the connector is rotated by approximately 90° about the axis of the pivot pin 21. At this moment the connector 2 is in its working position (FIGS. 8, 10 and 12) and the stops 22 of the pivot pin 21 rest against the inside surface of one of the side walls 4 of the bridge 1, thus preventing the disengagement of the pivot pin 21 from the circular openings 8 of the bridge 1.

For mounting the wiper arm 3 on the connector 2 said connector is first brought in the position shown on FIG. 11 and the arm 3 is then mounted on the connector 2 as shown by arrows B, C, D. This position of the connector 2 is necessary for passing the arm 3 over the stops 12 of the front portions 16, 13 of the two side walls of the connector 2. Indeed in this position of the connector 2 said front portions 16, 13 project downwards beyond the lower edge 7 of the side walls 4 of the bridge 1 and the flexible portion 16 may resiliently move sidewards in order to let pass the arm 3 as shown at reference numerals 16, 16a of FIG. 9. It is, however, also possible to first mount the connector 2 on the arm 3 and to then attach the bridge 1 to the assembly connector/arm (FIG. 9).

For bringing the assembly connector/arm in its working position, the arm 3, and consequently the connector 2, is rotated from the position of FIG. 11 to the position of FIG. 12. At this moment the arm 3 may slightly rotate with respect to the bridge 1 as shown by the arm in dotted lines and by the arrow E.

A new assembly bridge/connector has thus been disclosed. It is, however, to be noted that some variants, other than those already mentioned above, are possible. If the connector will most generally be manufactured out of an appropriate plastic material, it is, however, quite evident that the bridge may either be made of steel or of plastic. When the bridge is made of plastic the thickness of the side walls of the bridge will necessarily be larger and therefore the stops 22 of the pivot pin 21 of the connector will have to be displaced towards the center of the pivot pin 21.

On the other hand the overall strength of the connector may be increased in inserting a steel pin or screw into its hollow (19) cylindrical body 11 and pivot pin 21. Said steel pin or screw could also be an integral part of a steel arm.

It is evident that other modifications and/or changes may be made without departing from the scope of the invention such as defined in the appended claims.

I claim:

1. A wiper blade bridge of which the cross section is substantially U-shaped and a connector for attaching thereto a wiper arm, characterized in that each of the two side walls of the U-shaped bridge has a circular opening provided with two opposed extensions and that the connector has a wiper arm connecting portion and a wiper blade connecting portion extending transversely to the arm connecting portion, the blade connecting portion comprises a cylindrical pivot pin provided with two radially outwardly extending opposed stops corresponding to said extensions of said circular openings of the U-shaped bridge, the pin extending through the openings in the side walls and the stops engaging the inside of the side wall adjacent the arm connecting portion as the connector and wiper arm pivot relative to the wiper blade when the arm and blade are in a windshield wiping position.

2. A device according to claim 1, characterized in that the connecting portion of the connector is secured to the wiper arm either in a releasable manner or in a non-releasable manner, or that the connecting portion of the connector is an integral part of the wiper arm.

3. A device according to claim 2, characterized in that the arm connecting portion has spaced apart side walls, and that the distance between the stops of said pivot pin and one of the side walls of the arm connecting portion is substantially equal to the thickness of the adjacent side wall of the bridge.

4. A device according to claim 3 wherein the wiper arm is of the hook-end type, characterized in that the arm connecting portion of the connector comprises a cylindrical body provided at its two extremities with the lateral spaced apart side walls linked together by a reinforcing and guiding cross-piece.

5. A device according to claim 4, characterized in that said pivot pin is in line with said cylindrical body and projects from one of the lateral side walls of the connector.

6. A device according to claim 4, characterized in that the front portion of the lateral side wall of the arm connecting portion of the connector which is closest to said stops of said pivot pin is flexible.

7. A device according to claim 6, characterized in that the front portion of the other lateral side wall of the arm connecting portion of the connector is rigid.

8. A device according to claim 7, characterized in that at least one inside surface of the front portions of the arm connecting portion of the connector is provided with a stop for engaging with and maintaining the wiper arm on the cylindrical body of the connector.

9. A device according to claim 1, characterized in that the connector is a one-piece plastic part.

* * * * *